United States Patent
Abraham et al.

(10) Patent No.: US 8,169,999 B2
(45) Date of Patent: May 1, 2012

(54) METHOD AND SYSTEM FOR PRESERVING CONTENT TIMING ACROSS FEMTOCELL INTERFACES VIA TIMESTAMP INSERTION

(75) Inventors: Charles Abraham, Los Gatos, CA (US);
Xuemin Sherman Chen, San Diego, CA (US); Wael William Diab, San Francisco, CA (US); Vinko Erceg, Cardiff, CA (US); Victor T. Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 627 days.

(21) Appl. No.: 12/355,321

(22) Filed: Jan. 16, 2009

(65) Prior Publication Data

US 2010/0182991 A1    Jul. 22, 2010

(51) Int. Cl.
*H04J 3/06* (2006.01)
(52) U.S. Cl. .................. 370/350; 370/338; 370/466
(58) Field of Classification Search .............. 370/349, 370/350, 338, 465, 466, 467
See application file for complete search history.

(56) References Cited

U.S. PATENT DOCUMENTS

| | | | |
|---|---|---|---|
| 7,302,269 B1 | 11/2007 | Crawford et al. | |
| 7,873,673 B2 * | 1/2011 | Cleveland et al. | 707/802 |
| 2002/0039371 A1 | 4/2002 | Hedayat et al. | |
| 2003/0214982 A1 * | 11/2003 | Lorek et al. | 370/537 |
| 2005/0036512 A1 * | 2/2005 | Loukianov | 370/469 |
| 2006/0209795 A1 | 9/2006 | Chow et al. | |
| 2007/0121655 A1 | 5/2007 | Jin | |
| 2007/0189184 A1 | 8/2007 | Ryu et al. | |
| 2007/0195830 A1 * | 8/2007 | Lorek et al. | 370/503 |
| 2008/0216145 A1 | 9/2008 | Barton et al. | |
| 2008/0244148 A1 | 10/2008 | Nix, Jr. et al. | |
| 2009/0042536 A1 | 2/2009 | Bernard et al. | |
| 2009/0061873 A1 | 3/2009 | Bao et al. | |

(Continued)

FOREIGN PATENT DOCUMENTS

WO    2007/000455    1/2007

OTHER PUBLICATIONS

Unpublished U.S. Appl. No. 12/391,009, filed Feb. 23, 2009.

(Continued)

*Primary Examiner* — Brian Nguyen
(74) *Attorney, Agent, or Firm* — Sterne, Kessler, Goldstein & Fox PLLC

(57) ABSTRACT

Aspects of a method and system for preserving content timing across femtocell interfaces via timestamp insertion are provided. In this regard, a femtocell may receive a first time-stamped packet via a first interface and transcode the time-stamped packet. The femtocell may buffer the transcoded packet based on a time-stamp recovered from the packet and may transmit the buffered transcoded packet via a second interface. One of the first interface and the second interface may utilize the Internet Protocol. One of the first interface and the second interface may be a non-cellular interface and the other interface may be a cellular interface. The femtocell may be operable to generate a timestamp corresponding to a time instant at which a time-stamped packet arrived via the first interface or the second interface. The timestamp may be referenced to a clock within a cellular enabled communication devices communicatively coupled to the femtocell.

20 Claims, 6 Drawing Sheets

U.S. PATENT DOCUMENTS

| | | |
|---|---|---|
| 2009/0092081 A1 | 4/2009 | Balasubramanian et al. |
| 2009/0098858 A1 | 4/2009 | Gogic |
| 2009/0164548 A1 | 6/2009 | Ch'ng |
| 2009/0279430 A1 | 11/2009 | Huber et al. |
| 2009/0288144 A1 | 11/2009 | Huber et al. |
| 2009/0292799 A1 | 11/2009 | Eisener et al. |
| 2009/0316649 A1 | 12/2009 | Chen |
| 2010/0167734 A1 | 7/2010 | Jones et al. |
| 2010/0184411 A1 | 7/2010 | Chen et al. |
| 2010/0184414 A1 | 7/2010 | Abraham et al. |
| 2010/0184423 A1 | 7/2010 | Kent et al. |
| 2010/0184450 A1 | 7/2010 | Chen et al. |
| 2010/0186027 A1 | 7/2010 | Hou et al. |
| 2010/0210239 A1 | 8/2010 | Karaoguz et al. |
| 2010/0220642 A1 | 9/2010 | Abraham et al. |
| 2010/0220692 A1 | 9/2010 | Diab et al. |
| 2010/0220731 A1 | 9/2010 | Diab et al. |
| 2010/0222054 A1 | 9/2010 | Abraham et al. |
| 2010/0222069 A1 | 9/2010 | Abraham et al. |
| 2010/0238836 A1 | 9/2010 | Diab et al. |

OTHER PUBLICATIONS

Unpublished U.S. Appl. No. 12/395,470, filed Feb. 27, 2009.
Unpublished U.S. Appl. No. 12/395,410, filed Feb. 27, 2009.
Unpublished U.S. Appl. No. 12/395,383, filed Feb. 27, 2009.
Unpublished U.S. Appl. No. 12/395,313, filed Feb. 27, 2009.
Unpublished U.S. Appl. No. 12/395,436, filed Feb. 27, 2009.
Unpublished U.S. Appl. No. 12/406,835, filed Mar. 18, 2009.
European Search Report corresponding to European Patent Application No. 10001341.6-1244, dated Jul. 5, 2010.

* cited by examiner

METHOD AND SYSTEM FOR PRESERVING CONTENT TIMING ACROSS FEMTOCELL INTERFACES VIA TIMESTAMP INSERTION

CROSS-REFERENCE TO RELATED APPLICATIONS/INCORPORATION BY REFERENCE

This patent application makes reference to:
U.S. patent application Ser. No. 12/395,470 filed on Mar. 2, 2009; and
U.S. patent application Ser. No. 12/406,835 filed on Mar. 18, 2009.

FIELD OF THE INVENTION

Certain embodiments of the invention relate to wireless communication. More specifically, certain embodiments of the invention relate to a method and system for preserving content timing across femtocell interfaces via timestamp insertion.

BACKGROUND OF THE INVENTION

A femtocell may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided preserving content timing across femtocell interfaces via timestamp insertion, substantially as shown in and/or described in connection with at least one of the figures, as set forth more completely in the claims.

These and other advantages, aspects and novel features of the present invention, as well as details of an illustrated

DETAILED DESCRIPTION OF THE INVENTION

Certain embodiments of the invention may be found in a method and system for preserving content timing across femtocell interfaces via timestamp insertion. In various embodiments of the invention, a femtocell may receive a first time-stamped packet via a first interface and transcode the time-stamped packet. The femtocell may buffer the transcoded packet based on a time-stamp recovered from the packet and may transmit the buffered transcoded packet via a second interface. One of the first interface and the second interface may utilize the Internet Protocol. One of the first interface and the second interface may be a non-cellular interface and the other interface may be a cellular interface. The femtocell may be operable to generate a timestamp corresponding to a time instant at which a time-stamped packet arrived via the first interface or the second interface. The femtocell may be operable to insert a timestamp into the transcoded packet. The timestamp may be referenced to a clock within a cellular enabled communication device communicatively coupled to the femtocell.

Figure 1A:
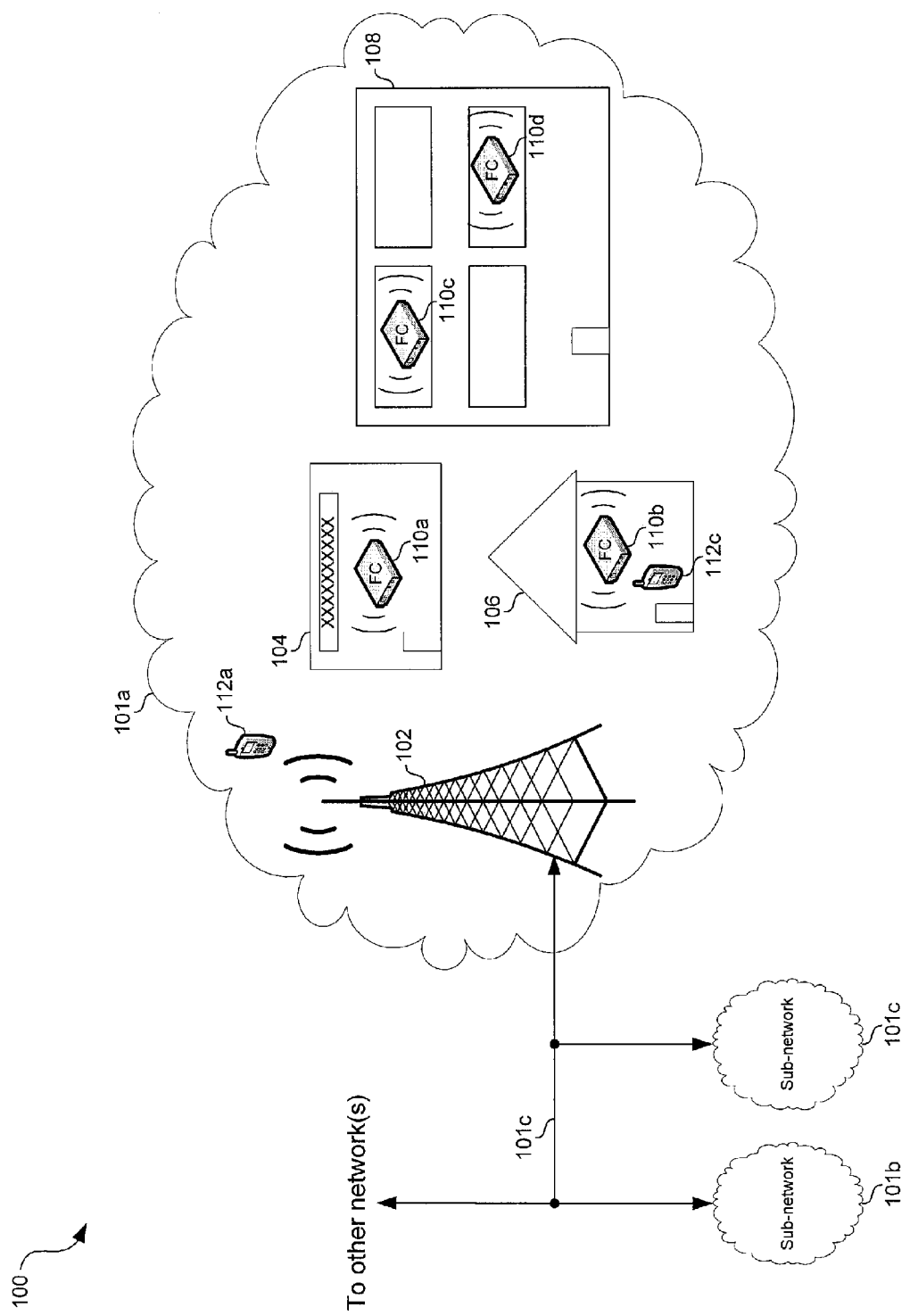
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a-101c. The exemplary sub-network 101a may comprise a base station 102, femtocells 110a-110d, which are collectively referred to herein as femtocells 110, and cellular enabled communication devices 112a and 112c, which are collectively referred to herein as cellular enabled communication devices 112. The femtocells 110 may be installed in one or more commercial properties 104, one or more residential properties 106, and/or one or more multi-tenant properties 108.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The base station 102 may be operable to communicate data wirelessly utilizing one or more cellular standards such as IS-95, CDMA2000, GSM, UMTS, TD-SCDMA, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecommunications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The femtocells 110 may each comprise suitable logic, circuitry, and/or code that may be operable to communicate wirelessly utilizing one or more cellular standards such as IS-95, CDMA2000, GSM, UMTS, TD-SCDMA, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2). Additionally, the femtocells 110 may each comprise suitable logic, circuitry, and/or code that may be operable to communicate over an IP network (not shown in FIG. 1A). Accordingly, a femtocell 110 may be operable to transcode one or more first packets for communication between a cellular and non-cellular interface. In various embodiments of the invention, the femtocells 110 may each be operable to insert a timestamp into received packets. In this regard, the packets may comprise multimedia content and the timestamp may enable delivery of the packets within timing constraints of the content.

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication devices comprise laptop computers, mobile phones, and personal media players. The cellular enabled communication devices 112 may be enabled to receive, process, and present multimedia content and may additionally be enabled run a network browser or other applications for providing Internet services. Additionally, the cellular enabled communication devices 112 may comprise one or more clocks which may be utilized to determine when to process, present, and/or transmit data. In various embodiments of the invention, the cellular enabled communication devices 112 may each be operable to insert a timestamp into cellular packets transmitted to a femtocell. In this regard, the packets may comprise multimedia content and the timestamp may enable delivery of the packets within timing constraints of the content.

In operation, a packet transmitted via a femtocell 110 from a data source to a cellular enabled communication device 112 may comprise time sensitive data. However, the data source may utilize a first timing reference and other devices or networks traversed en route to the cellular enable communication device 112 may utilize different timing references. Accordingly, in various embodiments of the invention, each time the packet enters a different network, or different clock domain, the ingress node of that network, or clock domain, may insert a timestamp corresponding to the time instant at which the packet arrived. The packet may then be forwarded through the network, or clock domain, based on the timestamp and based on timing constraints, such as jitter and/or latency requirements, of the packet. Timing constraints may be determined by inspecting the packets. For example, if the network is an audio video bridging (AVB) network, the timing constraints may be determined based on a class of service assigned to the packet. The packet may be buffered and forwarded through the network based on the timing constraints and the inserted network timestamp. In this regard, an egress node of the network, or clock domain, may utilize the inserted network timestamp to determine whether to quickly forward the packet or if it may buffer the packet longer while still meeting the timing constraints.

For example, a content source may be coupled to a DVB network and a clock utilized for encoding content, and thus generating decode timestamp (DTS), presentation timestamp (PTS), and/or a precision clock reference (PCR) fields, may be the same clock utilized throughout the DVB network. In such instances, it may be easy to maintain timing requirements of the content since the encoder and the network are synchronized. However, en route to a femtocell 110 and ultimately a cellular enabled communication device 112, the content may traverse a non-DVB network, such as an Ethernet with AVB network, and such a non-DVB network may utilize a different clock that is not synchronized to the DVB network. Accordingly, the PTS/DTS/PCR information may be of little use to devices within the AVB network in determining, for example, how much buffering of packets from the DVB network may be tolerated. Accordingly, the devices of the AVB network may only be able to estimate jitter and/or latency based on worst case scenarios. Conversely, in various embodiments of the invention, an ingress node of the AVB network, which may be a femtocell 110, may insert a network timestamp into packets containing time sensitive data. In this manner, devices in the AVB network, which may include a femtocell 110, may be enabled to determine actual jitter and/or latency of the packet through the AVB network based on the current network time and the network timestamp in the packet.

Figure 1B:
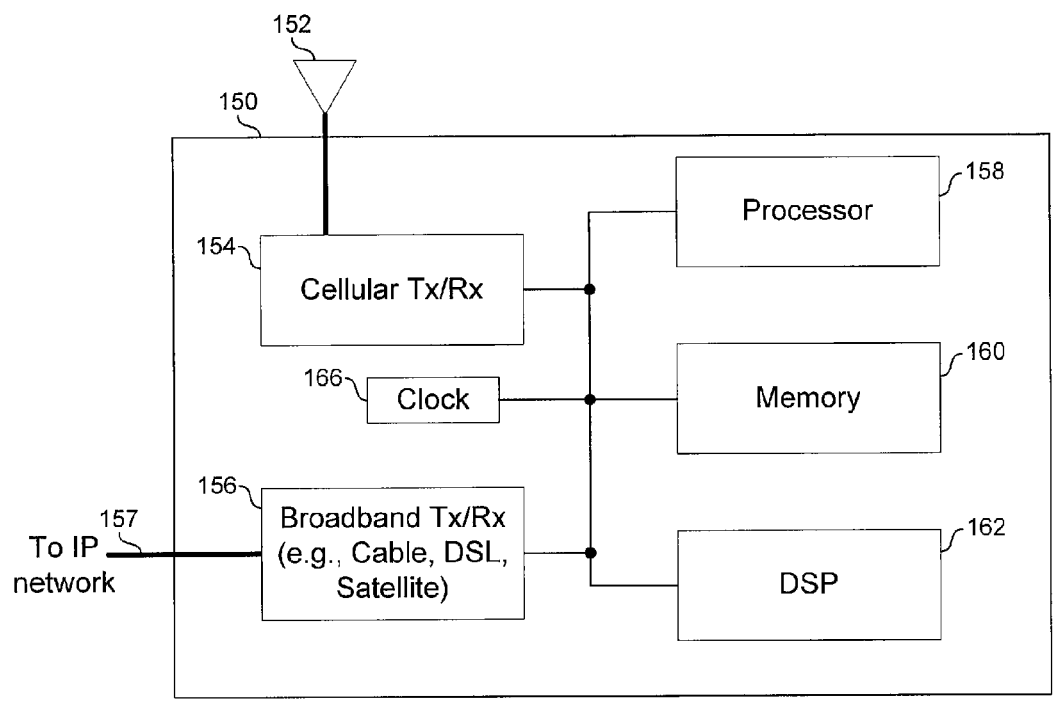
FIG. 1B is an exemplary block diagram of a femtocell, in accordance with an embodiment of the invention.

FIG. 1B is an exemplary block diagram of a femtocell, in accordance with an embodiment of the invention. Referring to FIG. 1B, there is shown a femtocell 150 comprising an antenna 152, a cellular transmitter and/or receiver (Tx/Rx) 154, a broadband transmitter and/or receiver (Tx/Rx) 156, a processor 158, a memory 160, a digital signal processor (DSP) 162, a network connection 164, and a clock 166. The femtocell 150 may be similar to or the same as the femtocells 110 described with respect to FIG. 1A.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA) and/or code division multiple access (CDMA). Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2).

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the link 157 which may be a T1/E1 line, passive optical network, DSL, cable television infrastructure, satellite broadband internet connection, satellite television infrastructure, and/or Ethernet.

The processor 158 may comprise suitable logic, circuitry, and/or code that may enable processing data and/or controlling operations of the femtocell 150. With regard to processing data, the processor 158 may enable packetization, depacketization, transcoding, reformatting, and/or otherwise processing data received from and/or to be transmitted by the cellular Tx/Rx 154 and/or from the broadband Tx/Rx 156. In this regard, the processor 158 may perform or control operations to transcode packets from a first format to one or more other formats. With regard to controlling operations of the femtocell 150, the processor 158 may be enabled to provide control signals to the various other blocks comprising the femtocell 150. The processor 158 may also control data transfers between various portions of the femtocell 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160.

The memory 160 may comprise suitable logic, circuitry, and/or code that may enable storage or programming of information that includes parameters and/or code that may effectuate the operation of the femtocell 150. The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store received data and/or data to be transmitted. In this regard, the memory 160 may enable packetization, de-packetization, transcoding, reformatting, and/or otherwise processing data received from and/or to be transmitted by the cellular Tx/Rx 154 and/or from the broadband Tx/Rx 156. In various embodiments of the invention, the memory 160 may comprise one or more look-up tables or other data structures which may comprise information for controlling operation of the femtocell 150.

The DSP 162 may comprise suitable logic, circuitry, and/or code operable to perform computationally intensive processing of data. The DSP 162 may encode, decode, modulate, demodulate, encrypt, decrypt, scramble, descramble, and/or otherwise process data. The DSP 162 may be enabled to adjust a modulation scheme, error coding scheme, and/or data rates of transmitted cellular signals data.

The clock 166 may comprise suitable logic, circuitry, and/or code that may be operable to generate and/or utilize one or more periodic signals to control synchronous operations and/or keep track of time. In various embodiments of the invention, the clock 266 may comprise one or more oscillators, phase locked loops, and/or direct digital frequency synthesizers.

In operation, the femtocell 150 may be operable to communicate data between cellular enabled communication devices and non-cellular enabled communication devices. The format of packets received from the cellular Tx/Rx 154 and/or from the broadband Tx/Rx 156 may depend on the standards and/or protocols in use. Accordingly, the femtocell 150 may be enabled to determine standards and/or protocols used in generating the packets such that the packets may be processed appropriately. Similarly, the format of packets to be transmitted by the cellular Tx/Rx 154 and/or from the broadband Tx/Rx 156 may vary depending on standards and/or protocols in use. Accordingly, the femtocell 150 may be enabled to packetize data according to one or more standards. Moreover, the femtocell 150 may transcode packets such that data received via the broadband Tx/Rx 156 may be transmitted via the cellular Tx/Rx 154 and data received via the cellular Tx/Rx 154 may be transmitted via the broadband Tx/Rx 156.

In an exemplary embodiment of the invention, a non-cellular packet may be received by the broadband Tx/Rx 156 and the broadband Tx/Rx 156 may generate a timestamp corresponding to the time instant at which the packet was received. A reference clock of the generated timestamp may be a clock utilized by one or more cellular enabled communication devices communicatively coupled to the femtocell 150. The received packet and the corresponding timestamp may subsequently be conveyed to the processor 158 and/or the memory 160. The processor 158, utilizing the memory 160, may then parse and/or de-packetize the received non-cellular packet to determine timing constraints of the packet. Additionally, the processor 158, utilizing the memory 160, may recover a network timestamp from the packet, which may have been inserted by an upstream node. The processor 158, utilizing the memory 160, may then transcode the packet to one or more cellular packets and may insert the generated timestamp into the cellular packets. The transcoded one or more packets may then be conveyed to the cellular Tx/Rx 154 for transmission to a cellular enabled communication device. In this regard, the transcoded one or more packets may be buffered and transmitted based on the timing constraints of the received packet, the generated timestamp, and/or the recovered timestamp.

In an exemplary embodiment of the invention, a cellular packet may be received by the cellular Tx/Rx 154 and the cellular Tx/Rx 154 may generate a timestamp corresponding to the time instant at which the data was received. In this regard, a reference clock of the generated timestamp may be a clock utilized by a non-cellular network to which the femtocell 150 is communicatively coupled. The received packet and the corresponding timestamp may subsequently be conveyed to the processor 158 and/or the memory 160. The processor 158, utilizing the memory 160, may then parse and/or de-packetize the received non-cellular packet to determine timing constraints of the packet. Additionally, the processor 158, utilizing the memory 160, may recover a network timestamp from the packet, which may have been inserted by an upstream node. The processor 158, utilizing the memory 160, may then transcode the packet to one or more cellular packets and may insert the generated timestamp into the cellular packets. The transcoded one or more packets may then be conveyed to the cellular Tx/Rx 154 for transmission to a cellular enabled communication device. In this regard, the transcoded one or more packets may be buffered and transmitted based on the timing constraints of the received packet, the generated timestamp, and/or the recovered timestamp.

Figure 2A:
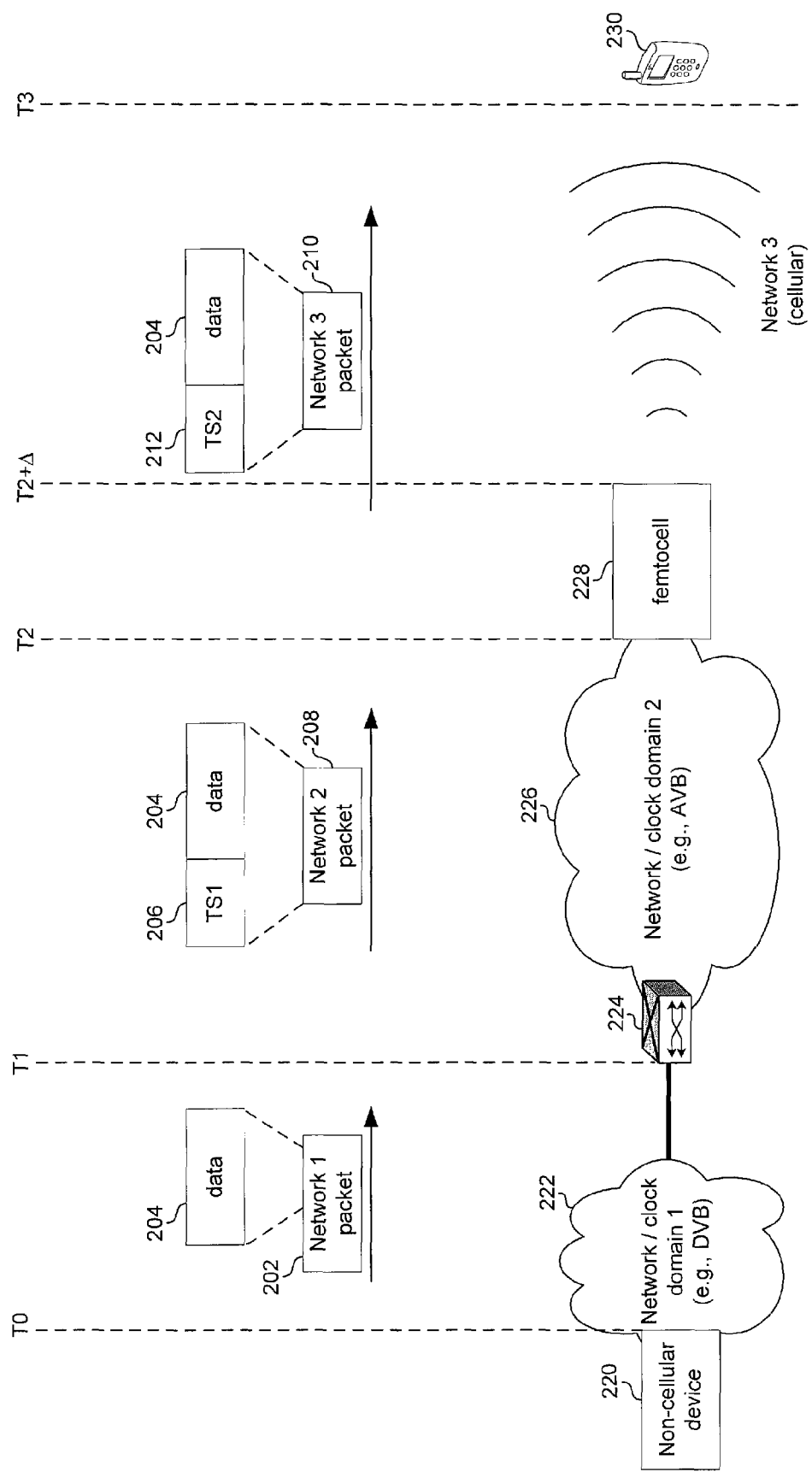
FIG. 2A is a diagram illustrating the utilization of network timestamps to maintain timing for traffic communicated from a non-cellular node to a cellular enabled communication device via a femtocell, in accordance with an embodiment of the invention.

FIG. 2A is a diagram illustrating the utilization of network timestamps to maintain timing for traffic communicated from a non-cellular node to a cellular enabled communication device via a femtocell, in accordance with an embodiment of the invention. Referring to FIG. 2A there is shown a timing diagram illustrating the conveyance of data from a non-cellular device 220 to a cellular enabled communication device 228 via a network 224, a network 226, and a femtocell 226. There is also shown a network node 224.

The non-cellular device 220 may comprise suitable logic, circuitry, and/or code that may be operable to packetize and communicate time sensitive data, multimedia content for example, via one or more wired and/or wireless network connections. Exemplary non-cellular devices 220 comprise file servers and/or computers operable to communicate over TCP/IP networks. The non-cellular 220 may be communicatively coupled to a network 222. In this regard, the non-cellular node 220 may generate packets native to the network 222. For example, the network 222 may be a digital video broadcast (DVB) network and the non-cellular 220 may output a packetized DVB stream. Accordingly, encoding of content into a DVB datastream and conveyance of packets through the DVB network may be synchronized to a common network clock.

The network node 224 may be an edge node, that is, a node located at a meeting or convergence point between two networks. The network node 224 may comprise suitable logic, circuitry, and/or code operable to forward packets between a first network and one or more other networks. In this regard, the various networks may utilize different protocols and/or standards and the node 224 may be operable to transcode packets accordingly. Additionally, the various networks may be members of different clock domains and thus different ports of the node 224 may be synchronized to different clocks. Moreover, the network node 224 may be operable to generate one or more timestamps corresponding to a time instant at which data arrives at the node 224. Furthermore, the node 224 may be operable to insert one or more generated timestamps into a packet prior to forwarding the packet from the network 222 to the network 226 or from the network 226 to the network 222.

The network 226 may comprise one or more network nodes and/or network links. Exemplary nodes may comprise servers, routers, and switches. Exemplary links may comprise Ethernet and/or fiber links. Nodes of the network 226 may be synchronized to a common clock. In various exemplary embodiments of the invention, the network 222 may utilize TCP/IP. In various exemplary embodiments of the invention, the nodes of the network 226 may be operable to utilize audio video bridging protocols and/or extensions thereto (collectively referred to herein as AVB). Such protocols include IEEE 802.1AS, IEEE 802.1Qat, and IEEE 802.1Qav.

The femtocell 228 may be similar to or the same as the femtocells 110 and/or 150 described with respect to FIGS. 1A and 1B.

The cellular enabled communication device 230 may be similar to or the same as the cellular enabled communication devices 112 described with respect to FIG. 1A.

At time instant T0, the content source 220 may transmit a packet comprising time sensitive data into the network 222 destined for the cellular enabled communication device 230. For example, the time sensitive data may comprise multimedia content.

From time instant T0 to time instant T1, buffering and forwarding of the packet through the network 222 may be determined based on a network clock which may also be the clock utilized by the content source 220 for encoding the multimedia content.

At time instant T1, the packet may arrive at node 224. The network time in the network 222 may be different from the network time in the network 226. As a result, time references such as DTS/PTS/PCR in the encoded multimedia content may be meaningless to nodes of the network 226. In this regard, the node 224 and other nodes of the network 226 may be unable to utilize timing information from the network 222. Accordingly, the network node 224 may generate a timestamp TS1 corresponding to time instant T1, where the time stamp is referenced to network time in the network 226. Moreover, the timestamp TS1 may be utilized to buffer and forward traffic through the network 226.

From time instant T1 to time instant T2, the packet may traverse the network 226 and buffering and forwarding by nodes in the network 226 may be performed based on the timestamp TS1.

At time instant T2, the packet may arrive at the femtocell 228. The femtocell may recover the time stamp TS1 and based on timing constraints of the received packet, determine how and/or when to buffer and/or forward the packet. For example, a duration for which the femtocell 228 may be allowed to buffer the packet may be determined based on the maximum latency allowed for the packet and T2−T1, and/or the amount of time it took the packet to traverse the network 226. Alternatively, T2−T1 may be compared to the amount of time previous packets took to traverse the network 226. The amount of time, T3−T2, that the packet is buffered by the femtocell 228 may be controlled to minimize packet jitter. Additionally, in some embodiments of the invention, the femtocell 228 may be operable to generate a timestamp TS2 corresponding to time instant T2, where TS2 is referenced to a clock utilized by the cellular enabled communication device 230.

From time T2 to T2+Δ, the femtocell 228 may be operable to process the received packet. This processing may comprise transcoding of the packet from a non-cellular format to a cellular format. Additionally, TS2 may be inserted into the transcoded packet. In various embodiments of the invention, TS1 may remain in the packet along with the inserted TS2 or TS2 may replace TS1 in the packet.

At time instant T2+Δ, the transcoded, and possibly timestamped, packet may be transmitted onto a cellular channel destined for the cellular enabled communication device 230.

From time instant T2+Δ to time instant T3, the packet may propagate to the cellular enabled communication device 230. The time interval T3−T2+Δ may comprise any necessary retransmissions necessary for the packet to be correctly received at the cellular enabled communication device 230.

At time instant T3, the packet may arrive at the cellular enabled communication device 230. The cellular enabled communication device 230 may process the received packet to extract the multimedia content, decode the content, and present the content. In some embodiments of the invention, the cellular enabled communication device 230 may generate a time stamp TS3 corresponding to the time instant T3. Additionally, in some embodiments of the invention, the cellular enabled communication device 230 may calculate T3−T2 and determined how long the packet took to arrive at the cellular enabled communication device 230 after arriving at the femtocell 228.

Figure 2B:
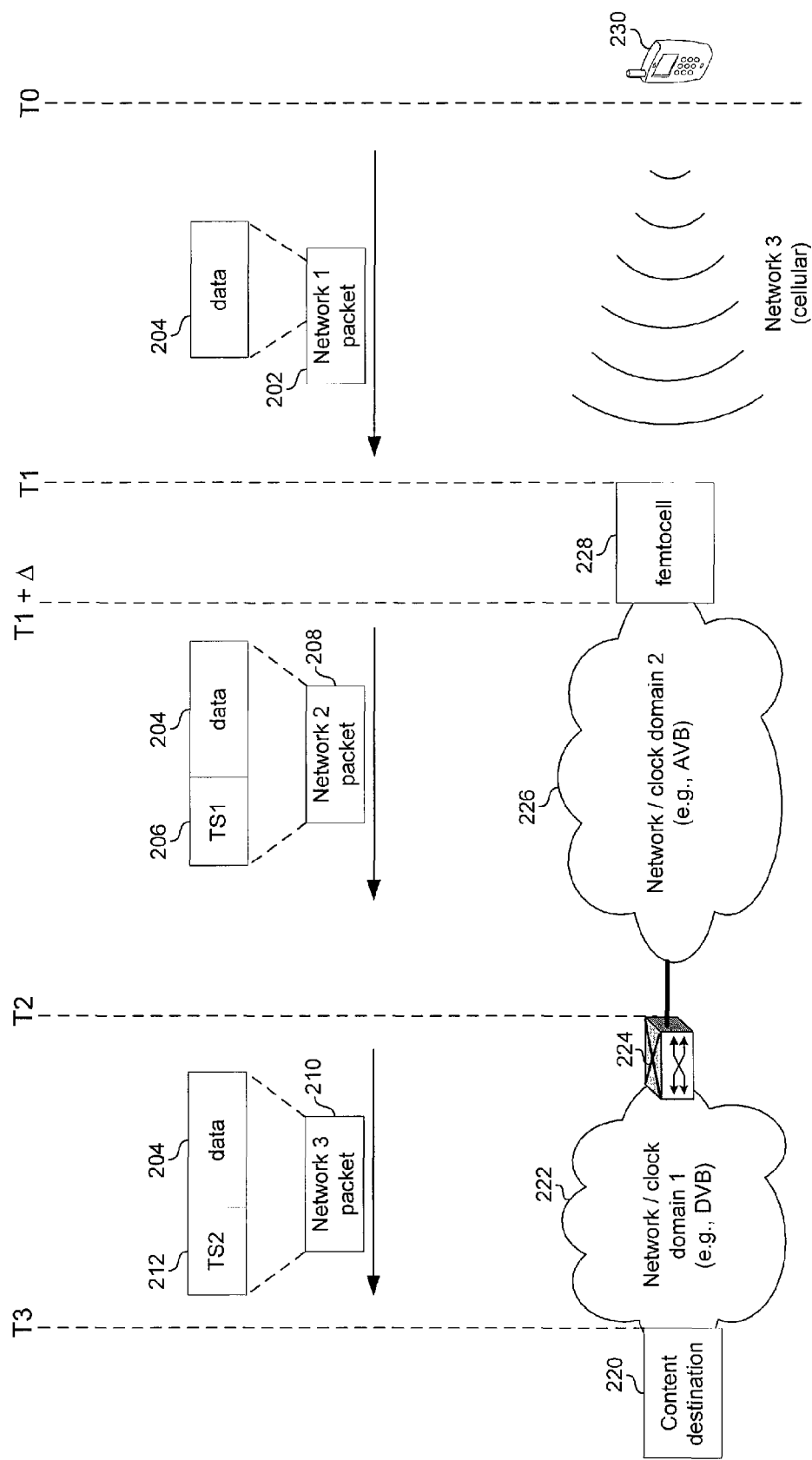
FIG. 2B is a diagram illustrating the utilization of network timestamps to maintain timing for traffic communicated from a non-cellular node to a cellular enabled communication device via a femtocell, in accordance with an embodiment of the invention.

FIG. 2B is a diagram illustrating the utilization of network timestamps to maintain timing for traffic communicated from a non-cellular node to a cellular enabled communication device via a femtocell, in accordance with an embodiment of the invention.

Referring to FIG. 2B there is shown a timing diagram illustrating the conveyance of data from a cellular enabled communication device 226 to a non-cellular device 223 via a femtocell 224 communicatively coupled to a network 222.

The non-cellular device 220, the network 222, the node 224, the network 226, the femtocell 228, and the cellular enabled communication device 230 may be as described with respect to FIG. 2A.

At time instant T0, the cellular enabled communication device 230 may transmit a packet comprising time sensitive data onto a cellular connection between the cellular enabled communication device 230 and the femtocell 228. The packet may be destined for the non-cellular device 220. In an exemplary embodiment of the invention, the time sensitive data may comprise multimedia content and the cellular enabled communication device 230 may be operable to generate a multimedia datastream utilizing, for example, DVB protocols.

From time instant T0 to time instant T1, the packet may propagate to the femtocell 228. The time interval (T1−T0) may comprise any necessary retransmissions necessary for the packet to be correctly received at the femtocell 228.

At time instant T1, the packet may arrive at the femtocell 228, which may effectively be an edge node between the network 226 and a cellular network comprising connections to one or more cellular enabled communication devices. Since network time in the network 226 may be different from the time in the cellular enabled communication device 230, time references such as DTS/PTS/PCR in the encoded multimedia content may be meaningless to nodes of the network 226. In this regard, nodes of the networks 226 may be unable to utilize time references from the cellular enabled communication device 230 in buffering and/or forwarding the packet. Accordingly, the femtocell 228 may generate a timestamp TS1 corresponding to time instant T1 where the timestamp is referenced to network time in the network 226.

From time T1 to T1+Δ, the femtocell 228 may be operable to process the received packet. This processing may comprise transcoding the packet from a cellular format to a non-cellular format. Additionally, TS1 may be inserted into the transcoded packet. At time instant T1+Δ, the transcoded and time-stamped packet may be transmitted into the network 226 destined for the non-cellular device 220. From time instant T1+Δ to time instant T2 the packet may traverse the network 226 and buffering and forwarding by nodes in the network 226 may be performed based on the timestamp TS1 and the timing constraints of the time sensitive data.

At time instant T2, the packet may arrive at node 224. Because network time in the network 226 may be different than network time in the network 222, the timestamp TS1 may be meaningless to devices of the network 222. Accordingly, the network node 224 may generate a timestamp TS2 corresponding to time instant T2 where the time stamp is referenced to network time in the network 222. Moreover, the timestamp TS2 may be utilized to buffer and forward traffic through the network 222.

At time instant T3, the packet may arrive at the non-cellular device 220. The non-cellular device 220 may process the received packet to extract the multimedia content, decode the content, and present the content. In some embodiments of the invention, the non-cellular device 220 may generate a time stamp TS3 corresponding to the time instant T3. Additionally, in some embodiments of the invention, the cellular enabled communication device 230 may calculate the difference between T3 and T2, and accordingly determine how long the packet took to arrive at the cellular enabled communication device 230 after arriving at the node 224.

Figure 3A:
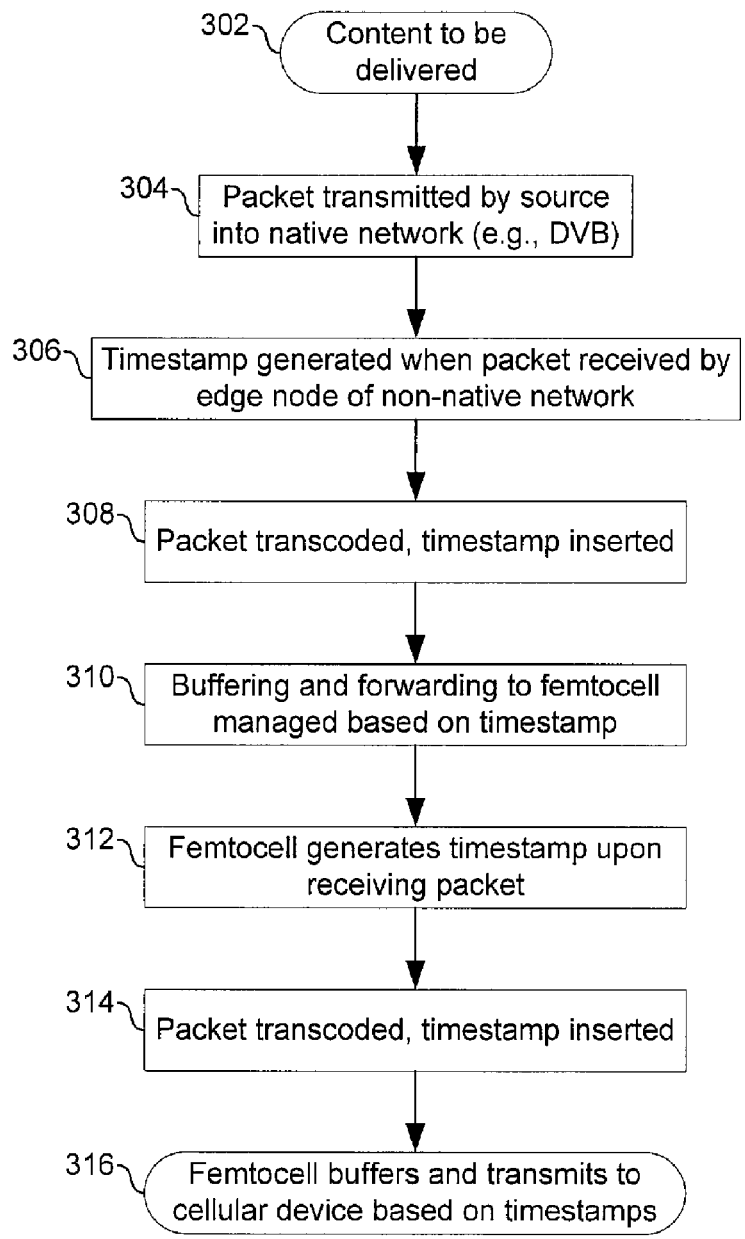
FIG. 3A is a flowchart illustrating exemplary steps for preserving timing across femtocell interfaces via timestamp insertion, in accordance with an embodiment of the invention.

FIG. 3A is a flowchart illustrating exemplary steps for preserving timing across femtocell interfaces via timestamp insertion, in accordance with an embodiment of the invention. Referring to FIG. 3A the exemplary steps may begin with step 302 when a content source has content to be delivered. Subsequent to step 302, the exemplary steps may advance to step 304.

In step 304, the content source may encode and packetize multimedia content and transmit a packet into a first network. In this regard, the format of the packet may be native to the first network. Accordingly, network operations such as buffering and forwarding of the packet may be synchronized with an encoder utilized to encode the multimedia content. Subsequent to step 304, the exemplary steps may advance to step 306.

In step 306, the packet may arrive at an ingress node of a second network. The second network may not be synchronized to the first network and, consequently, timing information such as PCR/PTS/DTS referenced to the first network may not be useful to devices of the second network. Accordingly, the ingress node may generate a timestamp corresponding to the time instant at which the packet was received by the ingress node. In this regard, the timestamp may be referenced to a clock within the second network. Subsequent to step 306, the exemplary steps may advance to step 308.

In step 308, the ingress node of the second network may transcode the received packet to make it suitable for conveyance through the second network. Additionally, the timestamp generated in step 308 may be inserted into the transcoded packet. Subsequent to step 308, the exemplary steps may advance to step 310.

In step 310, the transcoded packet may traverse the second network and one or more nodes of the network may buffer and/or forward the packet based on the timestamp in the transcoded packet. In this regard, one or more nodes of the second network may utilize the timestamp to determine actual propagation times through the network. This may be advantageous in that one or more nodes of the second network need not assume worst case conditions in other nodes. For example, if one node determines that the transcoded packet has experienced minimal delays in arriving at that node. Such a node may be enabled to buffer the transcoded packet for a longer period of time without exceeding the latency requirements of the transcoded packet. Subsequent to step 310, the exemplary steps may advance to step 312.

In step 312, the transcoded packet may arrive at a femtocell. In some embodiments of the invention, the femtocell may generate a timestamp corresponding to the arrival of the transcoded network. Subsequent to step 312, the exemplary steps may advance to step 314.

In step 314, the femtocell may transcode the received transcoded packet to make it suitable for conveyance through a cellular network. Additionally, the timestamp generated in step 312 may be inserted into the cellular packet. Subsequent to step 312, the exemplary steps may advance to step 314.

In step 316, the femtocell may utilize the timestamp in the cellular packet to determine if and how long to buffer the cellular packet. In this regard, the femtocell may be enabled to determine propagation times of the transcoded packet through the network and adjust its buffering of the packet to achieve timing constraints such as latency and jitter requirements. Accordingly, the femtocell may buffer the cellular packet and transmit the cellular packet at a determined time.

Figure 3B:
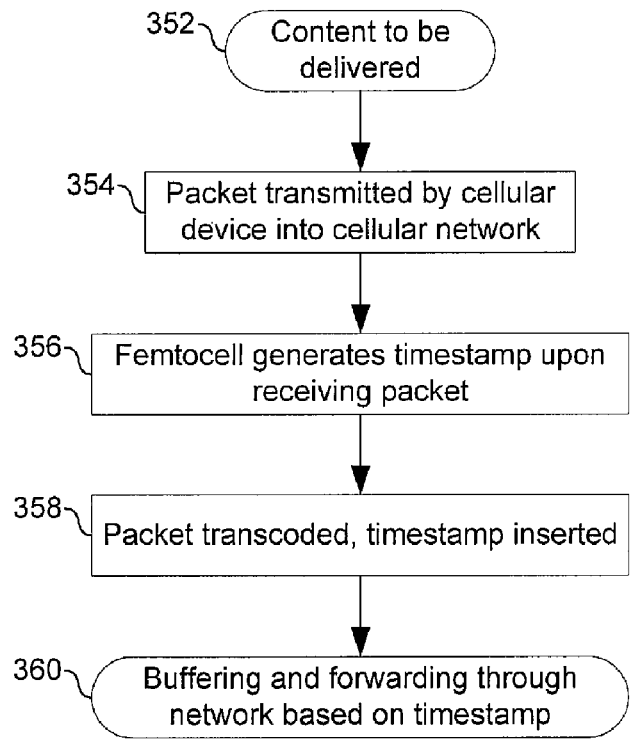
FIG. 3B is a flowchart illustrating exemplary steps for preserving timing across femtocell interfaces via timestamp insertion, in accordance with an embodiment of the invention.

FIG. 3B is a flowchart illustrating exemplary steps for preserving timing across femtocell interfaces via timestamp insertion, in accordance with an embodiment of the invention.

Referring to FIG. 3B the exemplary steps may begin with step 352 when a cellular enabled communication device has content to be delivered. Subsequent to step 352, the exemplary steps may advance to step 354.

In step 354, the cellular enabled communication device may encode and packetize multimedia content and transmit a packet onto a cellular connection to a femtocell. The content may be encoded utilizing a clock that is also utilized to transmit data onto the cellular connection. Subsequent to step 354, the exemplary steps may advance to step 356.

In step 356, the cellular packet may arrive at a femtocell and the femtocell may generate a timestamp corresponding to the arrival of the cellular packet. In this regard, the timestamp may be referenced to time utilized in a non-cellular network communicatively coupled to the femtocell. Subsequent to step 356, the exemplary steps may advance to step 358.

In step 358, the femtocell may transcode the cellular packet to make it suitable for conveyance through the non-cellular network. Additionally, the timestamp generated in step 356 may be inserted into the non-cellular packet. Subsequent to step 358, the exemplary steps may advance to step 360.

In step 360, the non-cellular packet may be transmitted into the non-cellular network. One or more devices in the non-cellular network may utilize the timestamp generated in step 356 to determine propagation times through the non-cellular network. In this manner, the timestamp may be utilized to manage buffering of the packet to maintain jitter and/or latency within required limits.

Exemplary aspects of a method and system for preserving content timing across femtocell interfaces via timestamp insertion are provided. In an exemplary embodiment of the invention, a femtocell 150 may receive a first time-stamped packet via a first interface, such as the cellular Tx/Rx 154 or the broadband Tx/Rx 156, and transcode the time-stamped packet. The femtocell 150 may buffer, in a memory 160, the transcoded packet based on a time-stamp recovered from the packet and may transmit the buffered transcoded packet via a second interface such as the cellular Tx/Rx 154 or the broadband Tx/Rx 156. One of the first interface and the second interface may utilize the Internet Protocol. One of the first interface and the second interface may be a non-cellular interface, such as the broadband Tx/Rx 156, and the other interface may be a cellular interface, such as the cellular Tx/Rx 154. The femtocell 150 may be operable to generate a timestamp corresponding to a time instant at which a time-stamped packet arrived via the first interface or the second interface. The femtocell may be operable to insert a timestamp into the transcoded packet. The timestamp may be referenced to a clock within a cellular enabled communication device 230 communicatively coupled to the femtocell.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for preserving content timing across femtocell interfaces via network independent timestamp insertion.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   receiving in a femtocell, a first time-stamped packet via a first interface of said femtocell;
   transcoding said time-stamped packet;
   buffering said transcoded packet based on a timestamp recovered from said time-stamped packet; and
   transmitting said buffered transcoded packet via a second interface of said femtocell.

2. The method according to claim 1, wherein one of said first interface and said second interface utilizes an Internet Protocol.

3. The method according to claim 1, wherein said first interface is a non-cellular interface and said second interface is a cellular interface.

4. The method according to claim 3, comprising generating, in said femtocell, a timestamp corresponding to a time instant at which said time-stamped packet arrived via said non-cellular interface.

5. The method according to claim 4, comprising inserting said timestamp into said transcoded packet.

6. The method according to claim 4, wherein said timestamp is referenced to a clock of one or more cellular enabled communication devices communicatively coupled to said cellular interface.

7. The method according to claim 1, wherein said first interface is a cellular interface and said second interface is a non-cellular interface.

8. The method according to claim 7, comprising generating, in said femtocell, a timestamp corresponding to a time instant at which said packet arrived via said cellular interface.

9. The method according to claim 8, comprising inserting said timestamp into said transcoded packet.

10. The method according to claim 8, wherein said timestamp is based on a network time of a network communicatively coupled to said non-cellular interface.

11. A system for communication, the method comprising:
    at least one processor for use in a femtocell, said at least one processor is operable to receive a first time-stamped packet via a first interface of said femtocell;
    said at least one processor is operable to transcode said time-stamped packet;
    said at least one processor is operable to buffer said transcoded packet based on a timestamp recovered from said time-stamped packet; and
    said at least one processor is operable to transmit said buffered transcoded packet via a second interface of said femtocell.

12. The system according to claim 11, wherein one of said first interface and said second interface utilizes an Internet Protocol.

13. The system according to claim 11, wherein said first interface is a non-cellular interface and said second interface is a cellular interface.

14. The system according to claim 13, wherein said at least one processor is operable to generate a timestamp corresponding to a time instant at which said time-stamped packet arrived via said non-cellular interface.

15. The system according to claim 14, wherein said at least one processor is operable to insert said timestamp into said transcoded packet.

16. The system according to claim 14, wherein said timestamp is referenced to a clock of one or more cellular enabled communication devices communicatively coupled to said cellular interface.

17. The system according to claim 11, wherein said first interface is a cellular interface and said second interface is a non-cellular interface.

18. The system according to claim 17, wherein said at least one processor is operable to generate, in said femtocell, a timestamp corresponding to a time instant at which said packet arrived via said cellular interface.

19. The system according to claim 18, wherein said at least one processor is operable to insert said timestamp into said transcoded packet.

20. The system according to claim 18, wherein said timestamp is based on a network time of a network communicatively coupled to said non-cellular interface.

* * * * *

UNITED STATES PATENT AND TRADEMARK OFFICE
CERTIFICATE OF CORRECTION

| | |
|---|---|
| PATENT NO. | : 8,169,999 B2 |
| APPLICATION NO. | : 12/355321 |
| DATED | : May 1, 2012 |
| INVENTOR(S) | : Abraham et al. |

It is certified that error appears in the above-identified patent and that said Letters Patent is hereby corrected as shown below:

Column 1, Line 14, please add --Each of the above stated applications is hereby incorporated herein by reference in its entirety.-- before "Field of the Invention."

Signed and Sealed this
Thirteenth Day of November, 2012

David J. Kappos
*Director of the United States Patent and Trademark Office*